(12) United States Patent
Lin et al.

(10) Patent No.: US 9,184,001 B2
(45) Date of Patent: Nov. 10, 2015

(54) KEYCAP, KEY STRUCTURE AND KEYBOARD

(71) Applicant: GIGA-BYTE TECHNOLOGY CO., LTD., New Taipei (TW)

(72) Inventors: Yin-Yu Lin, New Taipei (TW); Yen-Bo Lai, New Taipei (TW); Pei-Chen Lin, New Taipei (TW); Shu I Chen, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 121 days.

(21) Appl. No.: 14/050,343

(22) Filed: Oct. 10, 2013

(65) Prior Publication Data

US 2015/0001059 A1    Jan. 1, 2015

(30) Foreign Application Priority Data

Jun. 28, 2013 (TW) .............................. 102123304 A (51) Int. Cl.
*H01H 9/26* (2006.01)
*H01H 13/84* (2006.01)
*G06F 3/02* (2006.01)
*H01H 13/02* (2006.01)

(52) U.S. Cl.
CPC ............ *H01H 13/84* (2013.01); *G06F 3/02* (2013.01); *G06F 3/0202* (2013.01); *H01H 13/02* (2013.01); *H01H 2221/044* (2013.01); *H01H 2221/08* (2013.01); *H01H 2221/084* (2013.01); *H01H 2233/108* (2013.01); *H01H 2235/03* (2013.01)

(58) Field of Classification Search
CPC ..... H01H 13/705; H01H 13/86; H01H 13/88; H01H 13/84; H01H 2209/074; H01H 2217/016; H01H 2221/024; H01H 2221/078; H01H 13/00; H01H 13/7065; H01H 2215/004; H01H 2215/008; H01H 2221/044
USPC .......................... 200/512, 314, 341, 345, 5 A
See application file for complete search history.

(56) References Cited

U.S. PATENT DOCUMENTS 3,736,397 A * 5/1973 Pedersen ...................... 200/318.1
3,916,360 A * 10/1975 Pedersen et al. .............. 335/205
4,596,912 A * 6/1986 Hattori ......................... 200/302.2

(Continued)

FOREIGN PATENT DOCUMENTS

DE     2245751 A1    5/1973
EP     1528583 A1    5/2005

(Continued)

*Primary Examiner* — Kyung Lee
(74) *Attorney, Agent, or Firm* — Chun-Ming Shih (57) ABSTRACT

A keyboard includes a main board and at least one key structure positioned on the main board. The key structure includes a key switch and a key cap. The key cap is combined with the key switch. The key switch includes a key base and a shaft movably positioned on the key base. The keycap includes a main body and a cushion member. The main body is positioned on the shaft of the key switch. The main body is spaced apart from the contact surface of the key base. The main body is moved forward and backward relative to the key base with movement of the shaft. The cushion member is positioned at one side of the main body facing the contact surface. While the main body is moved to the contact surface, the cushion member abuts on the contact surface, so as to avoid the main body from hitting the key base directly, and hence minimizing the noise that is produced by the moving parts.

1 Claim, 6 Drawing Sheets

(56) References Cited

U.S. PATENT DOCUMENTS

| | | | | |
|---|---|---|---|---|
| 4,631,378 A | * | 12/1986 | Nobesawa | 200/342 |
| 4,864,085 A | * | 9/1989 | Hanajima et al. | 200/5 A |
| 5,396,038 A | * | 3/1995 | Yamada | 200/517 |
| 5,512,722 A | * | 4/1996 | Ozeki et al. | 200/517 |
| 5,821,482 A | | 10/1998 | Ootani et al. | |
| 5,990,435 A | * | 11/1999 | Chao | 200/517 |
| 6,853,366 B2 | * | 2/2005 | Bowen | 345/163 |
| 7,855,715 B1 | * | 12/2010 | Bowen | 345/168 |
| 2008/0042980 A1 | | 2/2008 | Bowen | |

FOREIGN PATENT DOCUMENTS

| | | |
|---|---|---|
| TW | 284342 | 8/1996 |
| TW | M243773 | 9/2004 |
| TW | 200641652 | 12/2006 |
| TW | 201225129 A1 | 6/2012 |

* cited by examiner

KEYCAP, KEY STRUCTURE AND KEYBOARD

BACKGROUND OF THE INVENTION

1. Field of the Invention

This disclosure relates to a key cap, key structure and a keyboard and, more particularly, to a key cap, a key structure with key in mechanistic model, and a keyboard with the key structures.

2. Related Art

Keyboards have become the dominant peripheral device for inputting words, symbols and numbers. In addition to computers, consumer electronics or large factory machines are also equipped with key structures that allow for input in order to operate these machines.

Overtime keyboards have evolved in their designs and functions. For example, there are foldable keyboards, thin film keyboards, waterproof keyboards and keyboards with backlight. More common keyboards are divided into two types: mechanistic model and the thin film model.

The structure of keys in mechanistic model includes (1) key cap, (2) key base, and (3) a shaft. The structure also includes other equipment located inside the key base such as the spring. When user presses the key cap to have it move downwardly, the key cap drives the shaft down producing the signal which the key represents. However, when the user presses the key, the spring of the cap and the downward movement of the key cap produce a noise as it crashes into the key base.

Due to this movement, the key base and the key cap sustain damage and may become inoperable overtime. Furthermore, the process also generates an unpleasant noise. The noise interferes with the work of users and may also affect others in the vicinity. Hence, it is not convenient to use this type of keyboard in a quiet environment such as an office or a library. Therefore, manufactures try to discover alternative methods in minimizing the noise of keyboards.

SUMMARY OF THE INVENTION

In view of the limitations described above, this disclosure provides a key cap, a key structure and a keyboard with the key structure in order to solve the limitations of conventional keyboards that generate noise, limiting the uses of the keyboard to particular environments and creating inconvenience for users.

The key cap is adapted for coupling with a key switch. The key switch includes a key base and a shaft. The shaft is movably positioned on the key base. The key cap includes a main body and a cushion member. The main body is positioned on the shaft and is spaced apart from a contact surface of the key base. The main body is moved forward and backward relative to the key base with movement of the shaft. The cushion member is positioned on one side of the main body facing the contact surface. When the main body moves to the contact surface, the cushion member abuts on the contact surface, and maintains resistance against the contact surface.

The key structure includes a key switch and a key cap. The key switch includes a key base, a resilient member, and a shaft. The key base includes a contact surface. The resilient member and the shaft are located in the key base. The shaft is placed on the resilient member, and is moved forward and backwards between an operating position and a releasing position relative to the key base. The shaft stays at the releasing position, and presses the resilient member while at the operating position. The key cap is located on the shaft, and is spaced apart from the contact surface of the key base. The key cap includes a cushion member. The cushion member is located on one side of the key cap facing the contact surface. While the shaft is located at the operating position, the cushion member abuts on the contact surface, and maintains resistance against the contact surface.

The keyboard includes a main board, and a plurality of key structures. The main board includes a plurality of cavities. The key structures are located in the said cavities. Each of the key structures includes a key switch, and a key cap. The key switch includes a key base, a resilient member, and a shaft. The key base includes a contact surface. The resilient member is positioned in the key base. The shaft is positioned on the resilient member and is able to be moved forward and back between an operating position and a releasing position relative to the key base. The shaft stays at the releasing position, and presses the resilient member while at the operating position. The key cap is placed on the shaft, and is spaced apart with the contact surface of the key base. The key cap includes a cushion member. The cushion member is positioned at one side of the key cap facing the contact surface. When the shaft is located at the operating position, the cushion member abuts on the contact surface and maintains resilience against the contact surface.

Accordingly, a key cap with a cushion member is disclosed for preventing punching or crashing from the key cap and the key base, so as to absorb the force because of the material characters of the cushion member. In this way, the noise of the keyboard can be minimized, and the comfort of use can be increased, allowing the uses of these keyboards in various environments.

BRIEF DESCRIPTION OF THE DRAWINGS

The present invention will become more fully understood from the following detailed description of some illustrative embodiments in conjunction with the accompanying drawings, in which.

DETAILED DESCRIPTION OF THE INVENTION

The following two embodiments disclose a key cap 220, a key structure 200 and a keyboard 10 in mechanistic model in accordance with the present invention.

Figure 1:
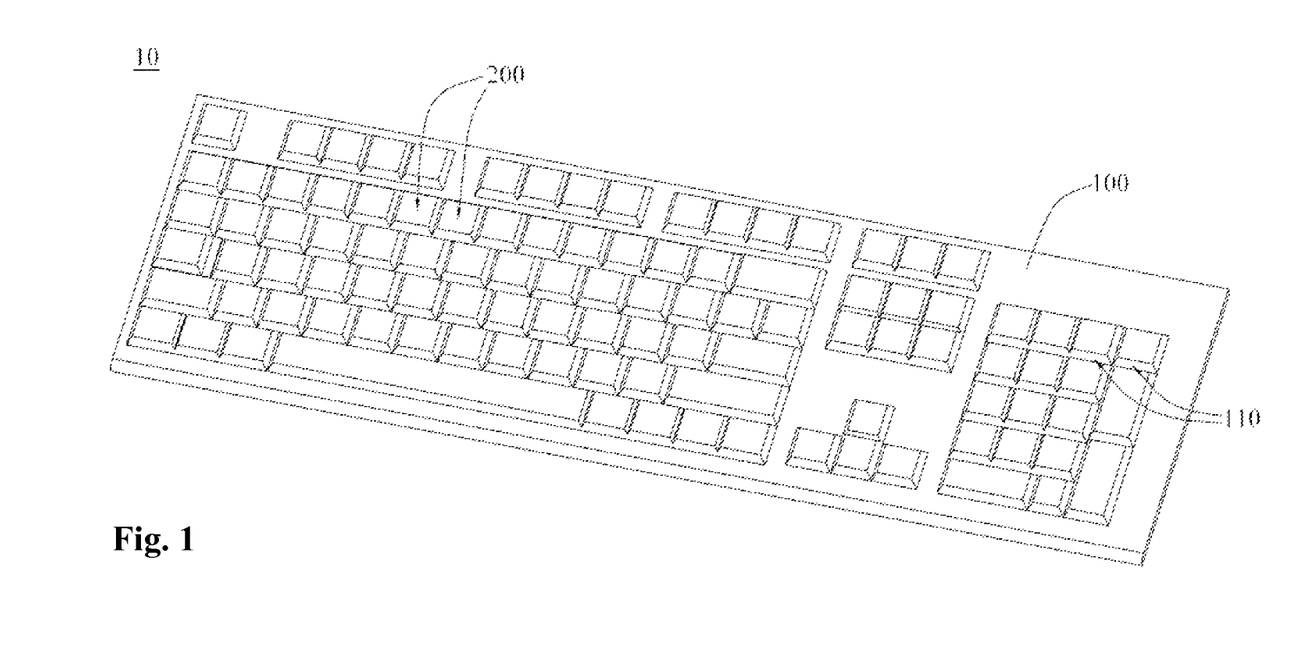
FIG. 1 is a diagram view of a keyboard in assembling situation in accordance with a first embodiment.
Figure 2:
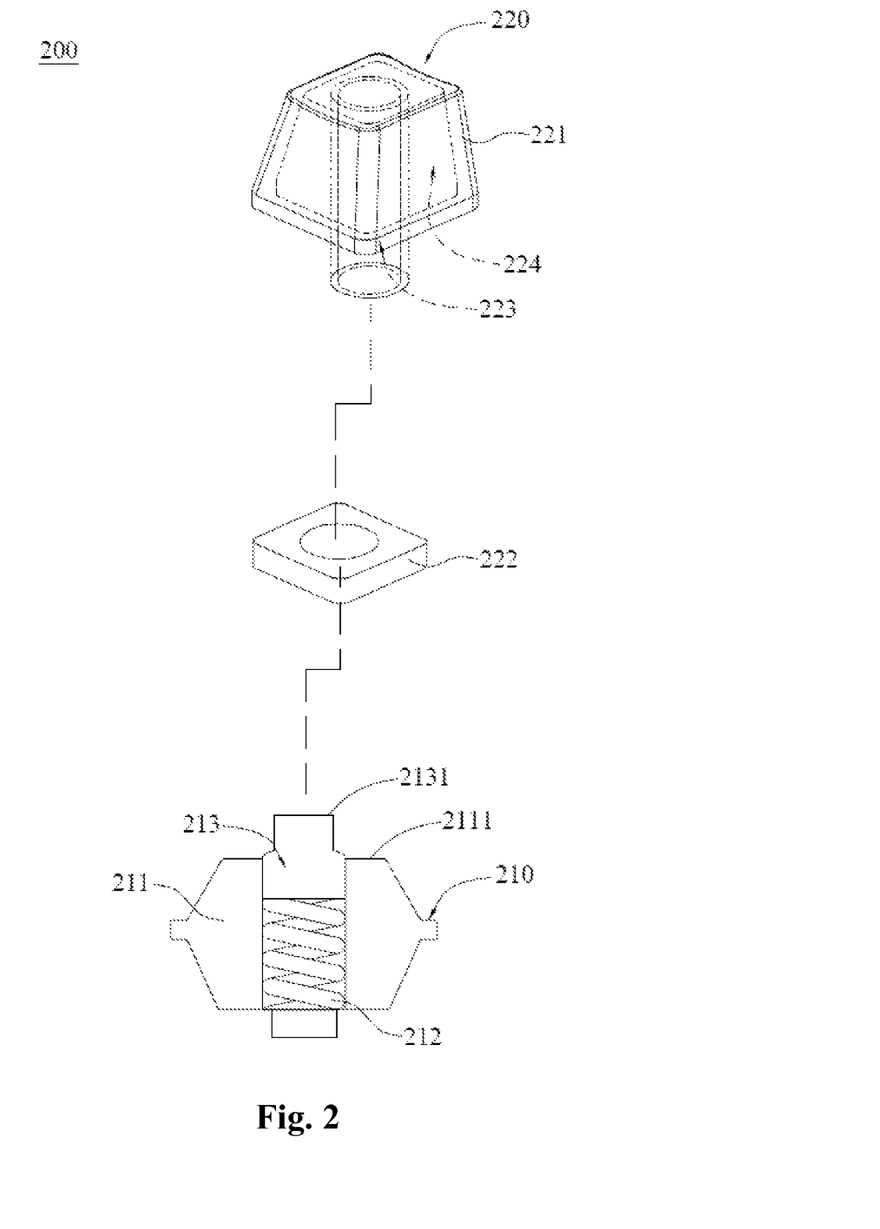
FIG. 2 is an exploded diagram view of a key structure in accordance with the first embodiment.
Figure 3:
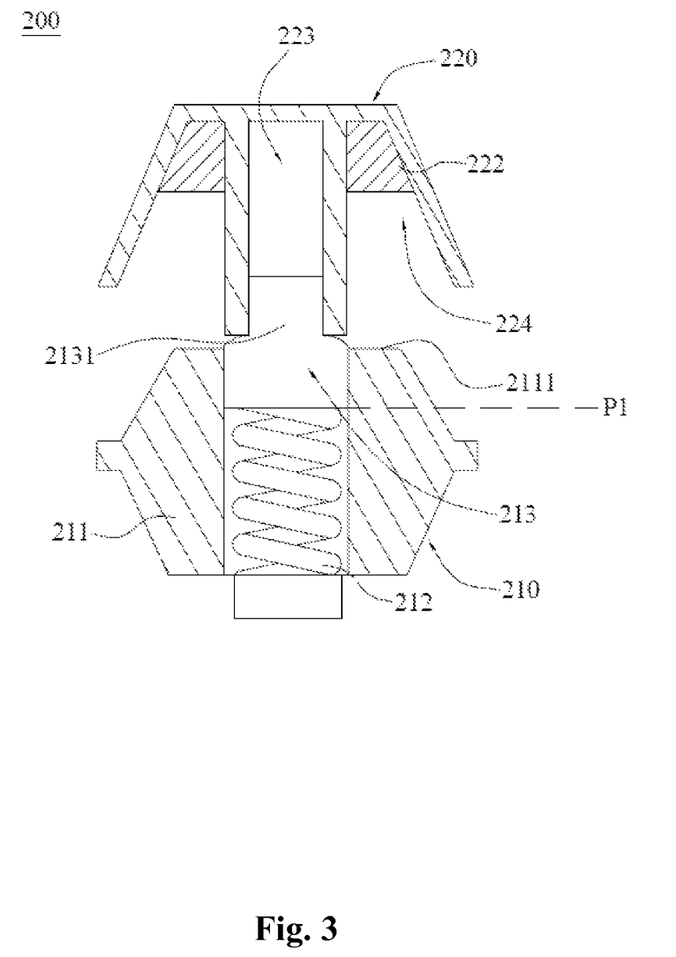
FIG. 3 is a diagram view of the key structure in assembling situation in accordance with the first embodiment.

Please refer to FIGS. 1 to 3; FIG. 1 is a diagram view of a keyboard in assembling situation in accordance with the first embodiment. FIG. 2 is an exploded diagram view of a key structure in accordance with the first embodiment.

The keyboard 10 is in accordance with the first embodiment and includes a main board 100 and a plurality of key structures 200. The main board 100 includes a plurality of cavities 110. Each of the key structures 200 couples to each of the cavities 110 so as to detachably engage with the main board 100. Each of the key structures 200 includes a key switch 210 and a key cap 220. The key cap 220 is detachably engaged on the key switch 210.

More specifically, the key switch 210 of the first embodiment includes a key base 211, a resilient member 212 and a shaft 213. The key base 211 includes a contact surface 2111 and a space. The space is defined inside the key base 211. An opening of the space is formed at the contact surface 2111. The resilient member 212 and the shaft 213 couple to the space of the key base 211 through the opening respectively.

Figure 4:
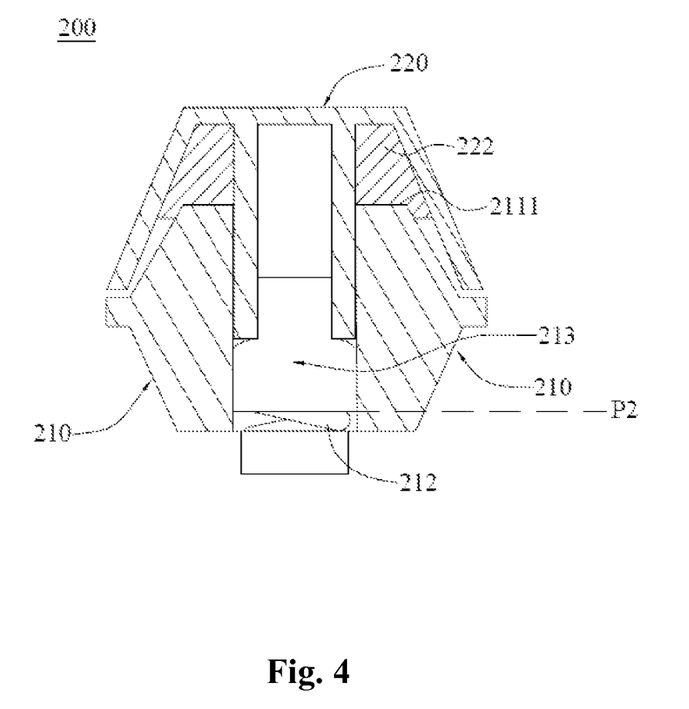
FIG. 4 is a diagram view of the key structure in operation in accordance with the first embodiment.

The shaft 213 is positioned onto the resilient member 212, or in non-pressing situation stays at a releasing position P1 relative to the key base 211. The shaft 213 is able to press the resilient member 212 so as to move to the operating position P2 relative to the key base 211 (as shown in FIG. 4). Furthermore, the shaft 213 includes a protruding member 2131. The protruding member 2131 is defined at one side of the shaft 213 opposite to the resilient member 212. The shape of the protruding member 2131 can be designed, but should not be limited to a cylindrical or a polygon shape. The protruding member 2131 is exposed out through the opening and protrudes out of the contact surface for coupling with the key cap 220. It is notable that the shaft 213 may be moved forward and back relative to the key base 211 via the elastic force generated from the resilient member 212. The resilient member 212 in the first embodiment is a compression spring, but it should not be limited to the first embodiment.

The key cap 220 includes a main body 221 and a cushion member 222. The main body 221 is made of thermoplastic materials such as polybutylece terephthalate (PBT) or polyformaldehyde (POM). Using thermoplastic materials allows for easy shaping. Furthermore, the material has good crashworthiness and wear-resisting ability.

A top surface and a bottom surface opposite to the top surface are defined in the main body 221. A coupling slot 223 and a trench 224 are formed at the bottom surface of the main body 221. More specifically, the coupling slot 223 is formed at an inner portion of a protruding part extended from the bottom surface, and the trench 224 is formed surround the outer portion of the protruding part extended from the bottom surface. In this way, a concave structure is formed at the bottom surface. The coupling slot 223 in the first embodiment is a blind hole, but it should not be limited to the first embodiment. The shape of the coupling slot 223 matches with the shape of the protruding member 2131. The cushion member 222 is engaged within the trench 224. The shape of the cushion member 222 matches with the shape of the trench 224. The cushion member 222 can be made out of any materials with resilience, and which can absorb the force and the noise from crashing such as foam, silicon rubber pad, rubber pad; so as to provide the main body 221 a cushioning function.

In addition, the engagement way of the cushion member 222 and the trench 224 can be done by agglutination or by embedment but it should not be limited to these methods alone.

Please further refer to FIGS. 2 to 4. FIG. 4 is a diagram view of the key structure in operation in accordance with the first embodiment. In greater detail, the coupling slot 223 in the main body 221 of the key cap 220 couples onto the protruding member 2131 of the shaft 213, tightly engaging with each other. The cushion member 222 in the trench 224 of the main body faces the contact surface 2111 of the key base 211. Therefore, when the shaft 213 stays at the releasing position P1, the main body 221 and the contact surface 2111 of the key base is spaced apart from each other with a distance. On the other hand, when the shaft 213 is pressed downwardly with an extra force and is moved to an operating position P2, the cushion member 222 abuts on the contact surface 2111, and maintains resistance against the contact surface 2111 so as to absorb the force from the key cap and then provide a cushion function. As a result, the key cap 220 can prevent crashing the key base 211 directly so as to avoid clicking noise or damages. Besides, when the shaft 213 is pressed with additional force and is moved to the operating position P2, and thus compresses the resilient member 212. The resilient member 212 generates an elastic force. When the extra force disappears, the shaft 213 is moved back to the releasing position P1 with the elastic force.

Accordingly, users can type in words by repeating the clicking action described previously. The noise produced by typing can be minimized, because the cushion member 222 provides the cushion function so as to prevent the main body 221 of the key cap 220 from crashing into the key base 211 directly.

Figure 5:
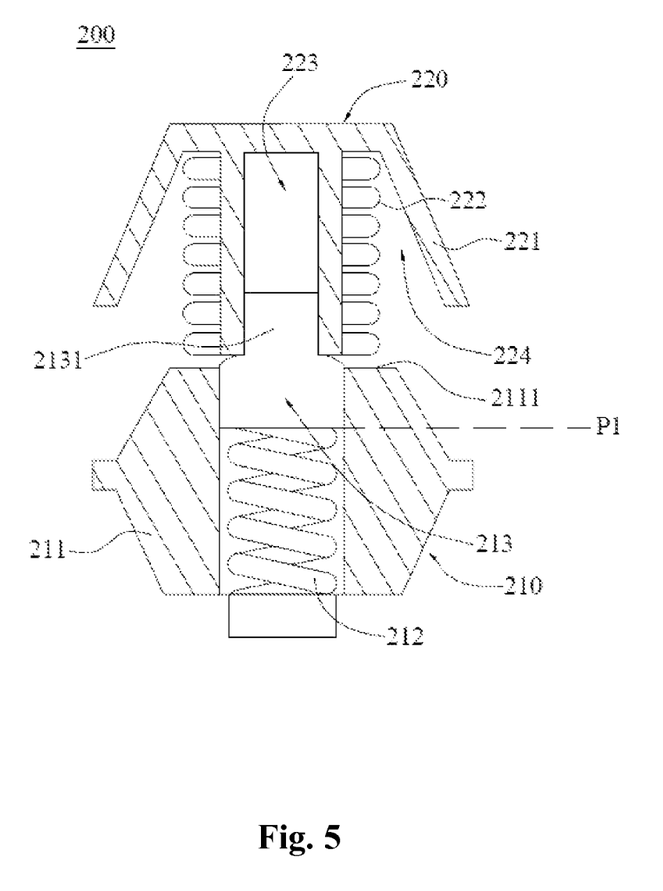
FIG. 5 is a diagram view of a key structure in assembling situation in accordance with a second embodiment.
Figure 6:
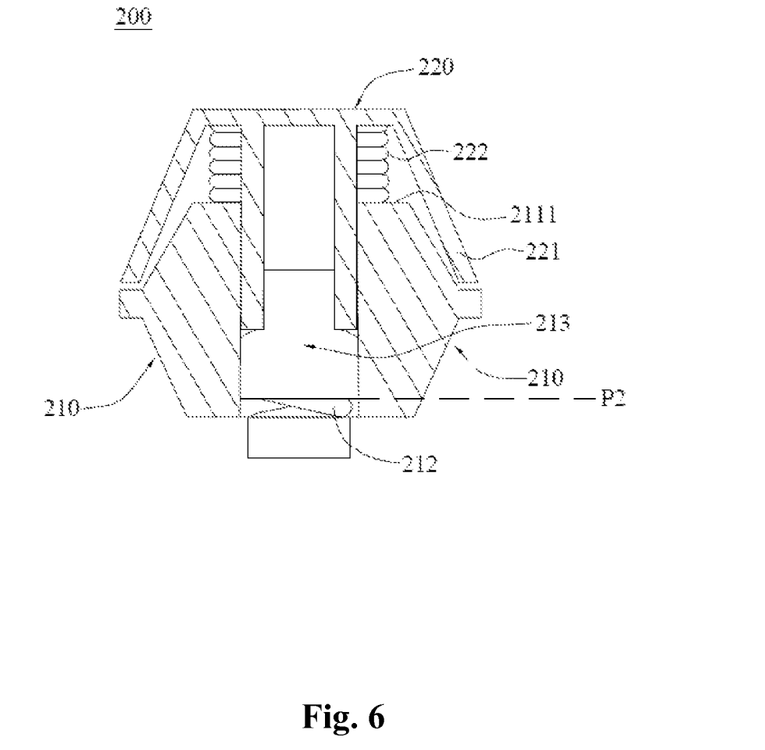
FIG. 6 is a diagram view of the key structure in operation in accordance with the second embodiment.

Please refer to FIGS. 5 and 6. FIG. 5 is a diagram view of a key structure in assembling situation in accordance with a second embodiment. FIG. 6 is a diagram view of the key structure in operation in accordance with the second embodiment. The key cap 220, the key structure 200 and the keyboard disclosed in the second embodiment are similar with those disclosed in the first embodiment. The following description will focus on the differences.

The key cap 220, in accordance with the second embodiment, includes a main body 221 and a cushion member 222. The main body 221 is made of thermoplastic materials such as polybutylece terephthalate (PBT) or polyformaldehyde (POM). Thermoplastic materials are easy to shape and have good crashworthiness and wear-resisting properties.

A top surface and a bottom surface opposite to the top surface are also defined in the main body 221. A coupling slot 223 and a trench 224 are formed at the bottom surface of the main body 221. More specifically, the coupling slot 223 is a blind hole formed at an inner portion of a protruding part extended from the bottom surface. The shape of the coupling slot 223 matches with the shape of the protruding member 2131 of the shaft 213. The trench 224 is a concave structure formed around the outer portion of the protruding part extended from the bottom surface.

The difference between the second embodiment and the first embodiment is that the cushion member 222 of the key cap 220 is a spring in the second embodiment. One end of the cushion member 222 is engaged within the trench 224 of the main body 221. The cushion member 222 is slipped onto the outer surface of the protruding part. In other words, the cushion member 222 surrounds the coupling slot 223. The other end of cushion member 222 can be against the contact surface 2111 of the key base 211, but should not be limited. In this way, the cushion member 222, a spring, is able to provide cushion function via the elastic force of the spring. In addition, the disposition of the cushion member 222 can be designed in other ways. For example, one end of the cushion member 222 can be fixed on the main body 221; the other end of the cushion member 222 can be dangled above the contact surface 2111 of the key base. In this way, the cushion function can also be provided during the process that the main body 221 of the key cap 220 is moved backward and forward relative to the key base 211.

When the shaft 213 stays at a releasing position P1 as usual, or during non-pressing situation, the main body 221 and the contact surface 2111 of the key base 211 are spaced apart with a distance from each other. On the other hand, when the key cap 220 is pressed downwardly with additional force, the main body 221 is moved to the contact surface 2111 and presses the shaft 213 downwardly to an operating position P2 so as to compress the cushion member 222 to abut on the contact surface 2111. In this way, when the main body 221 of the key cap 220 is moved to the key base, a cushion function can be provided by the cushion member 222. Therefore, the noise from the main body 221 of the key cap 220 crashing the key base 211 directly can be prevented. Additionally, when the resilient member 212 of the key switch 210 is compressed by the shaft 213, the resilient member 212 generates an elastic force. When the extra force disappears, the shaft 213 is moved back to the releasing position P1 with the elastic force, and also the motion of the shaft 213 drives the main body 221 of the key cap 220 to be moved away from the contact surface 2111 of the key base 211.

Accordingly, users can use the keyboard by repeating the clicking action described previously. The noise produced during typing can be avoided, because the cushion member 222 provides the cushion function so as to prevent the main body 221 of the key cap 220 from crashing the key base 211 directly.

Therefore, the keyboard with keycaps having cushion member prevents the key cap and the key base from crashing while operating. In addition, the cushion member is able to absorb the crashing force because of the materials which the cushion member made from. Hence, the noise produced by pressing the keys can be significantly decreased and improve comfort of users as to meet the users' needs.

The foregoing description of the exemplary embodiments of the disclosure has been presented only for the purposes of illustration and description and is not intended to be exhaustive or to limit the disclosure to the precise forms disclosed. Many modifications and variations are possible in light of the disclosure above. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:
1. A keyboard comprising:
a main board, including a plurality of cavities; and
a plurality of key structures, detachably positioned in said cavities respectively, and each of said key structures comprising:
  a key switch, said key switch comprising;
    a key base, including a contact surface;
    a resilient member, positioned in said key base; and
    a shaft, including a protruding member, positioned on said resilient member and being able to be moved forward and backwards between a operating position and a releasing position relative to said key base, wherein said shaft stays at the said releasing position and presses the said resilient member while at the said operating position; and
  a key cap, positioned on said shaft and spaced apart with the said contact surface of said key base, the said key cap comprising:
    a coupling slot positioned at one side of the said key cap facing the said contact surface, wherein the said coupling slot couples to the said protruding member, and the shape of the said coupling slot matches with the shape of the said protruding member;
    a cushion member positioned at one side of said key cap facing the said contact surface, when the said shaft is located at the said operating position, the said cushion member abuts on the said contact surface and maintains resistance against said contact surface; and
a trench, positioned at one side of said key cap facing the said contact surface, and said cushion member is engaged within said trench.

\* \* \* \* \*